(12) United States Patent
Vishnyakov (10) Patent No.: US 9,736,081 B2
(45) Date of Patent: Aug. 15, 2017

(54) APPARATUS AND METHOD TO IMPROVE COMPRESSION AND STORAGE DATA

(71) Applicant: AT&T Intellectual Property I, L.P., Atlanta, GA (US)

(72) Inventor: Andrew Vishnyakov, Frisco, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/730,854

(22) Filed: Jun. 4, 2015

(65) Prior Publication Data

US 2016/0359760 A1 Dec. 8, 2016

(51) Int. Cl.
*H04L 12/811* (2013.01)
*H04L 1/00* (2006.01)
*H04L 12/851* (2013.01)

(52) U.S. Cl.
CPC ............... *H04L 47/38* (2013.01); *H04L 1/00* (2013.01); *H04L 47/2483* (2013.01)

(58) Field of Classification Search
None
See application file for complete search history.

(56) References Cited

U.S. PATENT DOCUMENTS

| | | | |
|---|---|---|---|
| 5,045,852 A | 9/1991 | Mitchell et al. | |
| 5,410,671 A | 4/1995 | Elgamal et al. | |
| 5,909,250 A | 6/1999 | Hardiman | |
| 5,951,623 A | 9/1999 | Reynar et al. | |
| 7,114,174 B1 | 9/2006 | Brooks et al. | |
| 7,260,651 B2 | 8/2007 | Parrella et al. | |
| 7,420,992 B1 | 9/2008 | Fang et al. | |
| 7,640,362 B2 | 12/2009 | Brooks et al. | |
| 7,930,436 B1 | 4/2011 | Znosko | |
| 8,065,374 B2 | 11/2011 | Zhou et al. | |
| 8,073,824 B2 | 12/2011 | Appa et al. | |
| 8,275,909 B1 | 9/2012 | Rothstein | |
| 8,504,725 B2 | 8/2013 | Achler | |
| 8,554,746 B2 | 10/2013 | Weinberger et al. | |

(Continued)

OTHER PUBLICATIONS

"Sybase IQ Multiplex Qualified by EMC on 10-Terabyte DW," DSstar, tgc.com http://www.tgc.com/dsstar/01/0522/103072.html "Sybase also evaluated IQ Multiplex's scalability and data compression capabilities for large volumes of analytical data, confirming that IQ Multiplex data compression and column-indexing are more cost effective compared to traditional, relational technology. With the continuing growth of content collected from a variety of devices, such as the Internet and wireless communications tools, managing information successfully is becoming increasingly important."

(Continued)

*Primary Examiner* — Christine Duong (57) ABSTRACT

Methods, computer-readable media and apparatuses to improve storage and compression of data are disclosed. A processor receives a data stream, wherein the data stream comprises multiplexed data from a plurality of different sources, analyzes the data stream to identify a source of the plurality of different sources for each block of data of the data stream, demultiplexes the data stream based on the source of the each block of data of the data stream and applies a compression to the data stream that is demultiplexed based on the source of the each block of data of the data stream.

12 Claims, 4 Drawing Sheets

(56) References Cited

U.S. PATENT DOCUMENTS

| | | | |
|---|---|---|---|
| 8,650,217 B2 | 2/2014 | Werner | |
| 8,776,052 B2 | 7/2014 | Zohar | |
| 8,862,759 B2 | 10/2014 | Schneider et al. | |
| 8,886,837 B2 | 11/2014 | Short et al. | |
| 8,904,044 B2 | 12/2014 | Ebling et al. | |
| 8,949,466 B1 | 2/2015 | Crosbie et al. | |
| 2004/0198450 A1* | 10/2004 | Reilly | H04B 7/0822 455/562.1 |
| 2005/0188112 A1 | 8/2005 | Desai et al. | |
| 2006/0188017 A1 | 8/2006 | Hagai et al. | |
| 2007/0239881 A1* | 10/2007 | Schneider | H03M 7/30 709/231 |
| 2012/0102215 A1 | 4/2012 | Catrein | |

OTHER PUBLICATIONS

"Greenplum Database 4.0: Critical Mass Innovation," Architecture White Paper, Greenplum, emc.com, Aug. 2010. http://wvvw.emc.com/collateral/campaign/global/forums/ny-greenplum-db-criticalmass-innovation-wp.pdf "For each table (or partition of a table), the DBA can select the storage, execution, and compression settings that suit the way that table will be accessed (Figure 13)."

"Scalable cloud object storage," Rackspace®, rackspace.com http://www.rackspace.com/cloud/files?cm_mmc=Managed%20Cloud-_-PPC-_-Google-_-b_data%20storage "Automatically compress otherwise uncompressed data."

"PKZIP for Windows Desktop," PKWare®, pkware.com https://www.pkware.com/software/pkzip/windows "PKZIP continues to be the gold standard in data compression and file management."

"Data Center: Storage," ConRes IT Solutions, data-center.conres.com http://data-center.conres.com/solutions/data-center/storage/ "Reduce costs and data storage complexity."

"Express Data," Globalstar, globalstar.com https://www.globalstar.com/en/index.php?cid=1410"By utilizing a variety of advanced information compression and performance enhancement techniques, Express Data is able to optimize traffic flow across the existing Internet infrastructure."

"Industry Leading Compression Translates to Huge Cost Savings," RainStar®, rainstorm.com http://rainstor.com/products/rainstor-database/compress/ "Algorithmic compression: Field and pattern compression techniques save disk space as much as saving memory. RainStor's algorithmic compression involves innovative techniques designed to reduce the amount of disk space required for storage."

"IBM Real-time Compression," IBM, www-03.ibm.com http://www-03.ibm.com/systems/storage/network/rtc/"technology is designed to improve efficiency by compressing data as much as 80 percent, enabling you to store up to five times as much data in the same physical disk space."

Wald, Leon D. "Integrated voice/data compression and multiplexing using associative processing*," Honeywell Systems and Research Division, www.computer.org http://www.computer.org/csdl/proceedings/afips/1974/5082/00/50820133.pdf Discloses equipment and system for analyzing multiplex data using a parallel architecture.

* cited by examiner

APPARATUS AND METHOD TO IMPROVE COMPRESSION AND STORAGE DATA

The present disclosure relates generally to managing large amounts of data (e.g., big data) and, more particularly, to an apparatus, method and a computer-readable medium for improving storage and compression of data.

BACKGROUND

One of the largest components of Big Data, Software Defined Networking and Internet of Things data processing costs is the cost of storage. Various data storage techniques have been used before in an attempt to reduce the cost of storage for large amounts of data. Existing techniques are often insufficient and do not achieve high degree of data compression, as the existing techniques do not take into account data set creation methods or relationships between different data set dimensions. The storage and processing of uncompressed data affects the overall system performance as it saturates input/output (I/O) systems, central processing units (CPUs), networks, caches, and the like.

SUMMARY

In one example, the present disclosure discloses a method, computer-readable medium, and apparatus to improve data compression. For example, the method may include a processor that receives a data stream, wherein the data stream comprises multiplexed data from a plurality of different sources, analyzes the data stream to identify a source of the plurality of different sources for each block of data of the data stream, demultiplexes the data stream based on the source of the each block of data of the data stream and applies a compression to the data stream that is demultiplexed based on the source of the each block of data of the data stream.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and devices to improve storage and compression of data. As discussed above, one of the largest components of Big Data, Software Defined Networking and Internet of Things data processing costs is the cost of storage. Various data storage techniques have been used before in an attempt to reduce the cost of storage for large amounts of data. However, the storage and processing of uncompressed, or poorly compressed, data affects the overall system performance as it saturates input/output (I/O) systems, CPUs, networks, caches, and the like.

One embodiment of the present disclosure allows a network service provider to improve storage and compression of data by preprocessing the data before compressing the data stream. For example, rather than blindly compressing a data stream containing different types of data from different data sources as the data arrives, the present disclosure pre-processes the data to demultiplex the data stream based on a source. In addition, the data that is demultiplexed by the source may also have common dimension to the data that may be further combined. As a result, the compression that is applied to the data may be more effective (e.g., have a higher compression ratio) that may reduce the amount of storage needed and reduce the storage costs.

Figure 1:
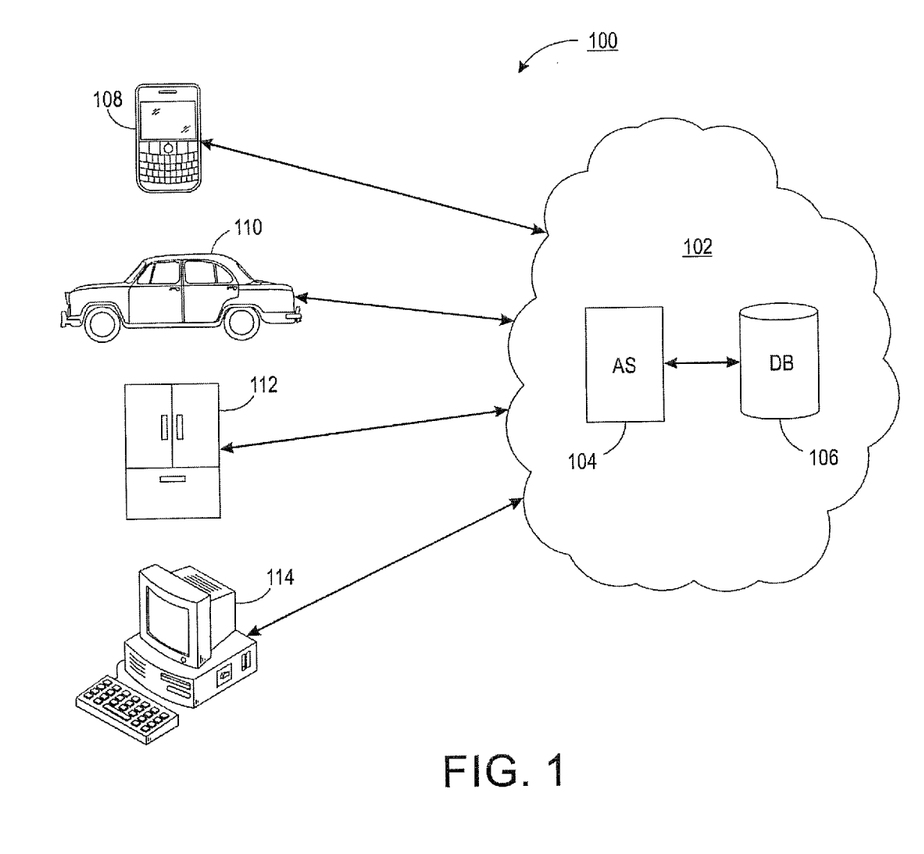
FIG. 1 illustrates an example network related to the present disclosure.

To aid in understanding the present disclosure, FIG. 1 illustrates a communication network 100. In one embodiment, the communication network 100 may include an Internet Protocol (IP) network 102. The IP network 102 may include an application server (AS) 104 and a database (DB) 106. Although only a single AS 104 and a single DB 106 is illustrated in FIG. 1, it should be noted that any number of application servers and databases may be deployed.

Figure 4:
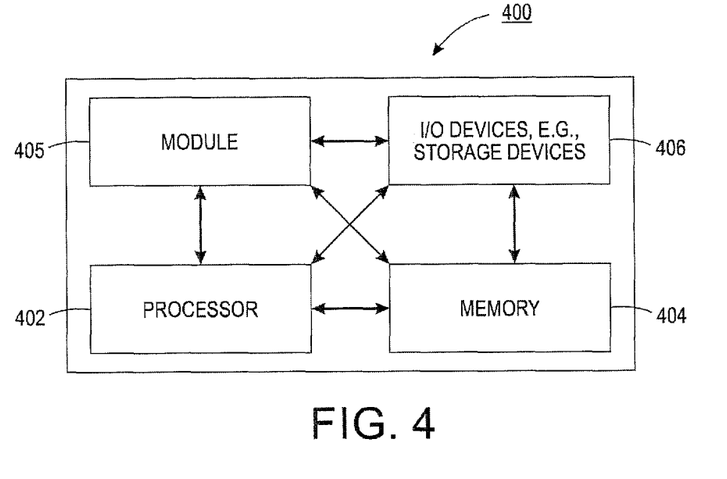
FIG. 4 illustrates a high-level block diagram of a computer suitable for use in performing the functions described herein.

In one embodiment, the AS 104 may be deployed as a computer having a processor and a memory as illustrated in FIG. 4 and discussed below. In one embodiment, the AS 104 may be configured to perform the functions described herein.

In one embodiment, the DB 106 may store data received from one or more sources of data 108, 110, 112 and 114. The DB 106 may also store data that is compressed by the AS 104. In one embodiment, the DB 106 may store compression algorithms (e.g., software applications or broadly computer executable instructions), predictive coding functions, and the like, needed by the AS 104 to compress data received from the one or more sources of data 108, 110, 112 and 114.

It should be noted that the IP network 102 has been simplified for ease of explanation. The IP network 102 may include additional network elements that are not shown, such as for example, a gateway (e.g., a serving gateway, a packet data network gateway, and the like), a firewall, a call control element, one or more access networks, an authentication, authorization and accounting server, a home subscriber server, a mobility management entity, and the like. In one embodiment, the IP network 102 may be a cellular communication network (e.g., a 3G, 4G, LTE, and the like).

In one embodiment, the one or more sources of data 108, 110, 112 and 114 may be any type of device, vehicle, appliance or transmitter that is capable of sending data. For example, the source of data 108 may be a wireless endpoint device (e.g., a smart phone, a laptop computer, a tablet computer, a wireless beacon, and the like). The source of data 110 may be a moving vehicle that continuously transmits global positioning system (GPS) location data or vehicle performance data (e.g., speed, acceleration, fuel consumption, distance traveled and the like) as the vehicle is moving. The source of data 112 may be an appliance (e.g., a refrigerator, a washer, a dryer, a backup generator, a water pump, a HVAC system and the like) that may continually transmit temperature data, inventory data, performance data, and the like. The source of data 114 may be a wired device (e.g., a desktop computer, a router, a gateway, and the like).

Although various examples of sources of data are illustrated in FIG. 1, it should be noted that the examples should not be limiting. The sources of data may be any device that transmits big data or transmits data as part of the Internet of Things, and the like. Devices associated with big data or the Internet of Things may transmit data continuously and in large volumes.

As discussed above, the large volumes of data are typically multiplexed together even though the data include different types of data from different sources of data 108, 110, 112 and 114. As a result, when a compression algorithm or method is applied to the multiplexed data stream, the amount of compression that is achieved may be minimal.

Figure 2:
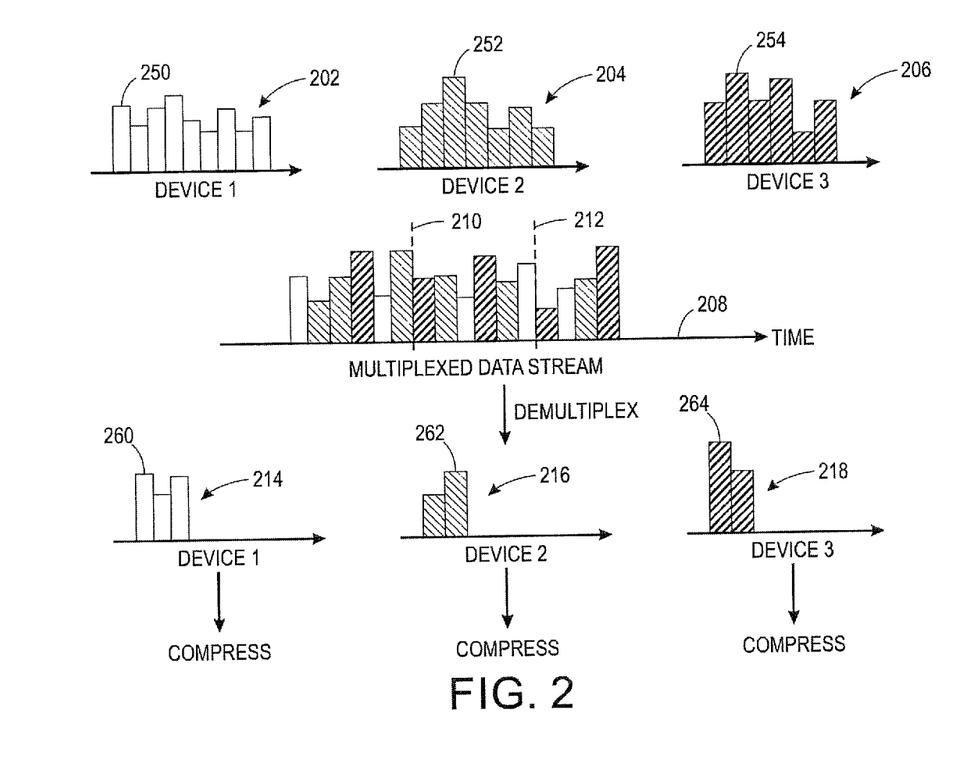
FIG. 2 illustrates a block diagram of an example data stream.

One embodiment of the present disclosure processes the multiplexed data stream such that when the compression algorithm or method is applied, a greater compression ratio may be achieved than blindly compressing the multiplexed data stream. FIG. 2 illustrates an example of a data streams 202, 204 and 206 being transmitted from different sources of data (e.g., a device 1, device 2 and device 3, respectively). Each one of the data streams 202, 204 and 206 may include a number of blocks of data 250, 252 and 254, respectively. Although three data streams 202, 204 and 206 are illustrated in FIG. 2 by example, it should be noted that any number of data streams may be arriving and multiplexed together.

In one embodiment, the data streams 202, 204 and 206 may be multiplexed together to form a multiplexed data stream 208. In one embodiment, the data streams 202, 204 and 206 may be multiplexed together by a local cell tower or gateway that transmits data back to the AS 104 in the IP network 102.

In one embodiment, the multiplexed data stream 208 may be processed by the AS 104 in real time in its entirety as the multiplexed data stream 208 arrives at the AS 104. For example, the multiplexed data stream 208 may be buffered and processed.

In another embodiment, the multiplexed data stream 208 may be divided into blocks of data 210 and 212. For example, the blocks of data 210 and 212 may be evenly distributed segments of the multiplexed data stream 208.

In one embodiment, the AS 104 may analyze the multiplexed data stream 208 to identify various statistics or information about the data in the multiplexed data stream 208. In one embodiment, the various statistics and/or information may include a source of the data, dimensions of the data, and the like. In one embodiment, the source of the data may be obtained from a source identification (ID) contained in each data block of the multiplexed data stream 208. In one embodiment, the dimensions of the data may include a type of data represented by each data block in the multiplexed data stream 208. For example, one data block may include a longitude coordinate, another data block may include a latitude coordinate, another data block may include a temperature, another data block may include a minute value, another data block may include a second value, and so forth.

In one embodiment, the multiplexed data stream 208 may be demultiplexed based on one or more of the various statistics or information obtained for each one of the data blocks in the multiplexed data stream 208. For example, the data blocks in the multiplexed data stream 208 may be separated and re-grouped based on the source of the data. For example, data blocks 250 identified from device 1 may be re-grouped together to form re-grouped data stream 214, data blocks 252 from device 2 may be re-grouped together to form re-grouped data stream 216 and data blocks 254 from device 3 may be regrouped together to form re-grouped data stream 218.

In one embodiment, the re-grouped data streams 214, 216 and 218 may be compressed at a greater compression ratio than the multiplexed data stream 208. For example, it may be assumed that the re-grouped data streams 214, 216 and 218 are sorted by a source of the data may be have a similar type of data, thereby, allowing for greater compression.

In one embodiment, the re-grouped data streams 214, 216 and 218 may be further processed to combine data blocks having common dimensions. In one embodiment, a dimension may be a characteristic, description, unit of measure, and the like associated with a data block. For example, the dimension may include a GPS coordinate (e.g., longitude value, a latitude value), a temperature value, a number, a time value (e.g., a day, an hour, a minute, a second, day of the week, etc.), and the like.

For example, the data stream 202 from device 1 may be from a vehicle that is continuously transmitting longitude and latitude coordinate data. In one embodiment, the blocks of data 250 in the data stream 202 may be analyzed to identify the data blocks containing a longitude data value and the data blocks containing a latitude data value. The longitude data values may then be combined and/or the latitude data values may be combined into combined data blocks 260. For example, the latitude and longitude data values are usually highly correlated for a given device or vehicle. As a result, the amount of data blocks that need to be compressed is further reduced, thereby, providing a greater compression ratio through known compression methods such as predictive coding or arithmetic coding. Similarly, the data blocks 252 and the data blocks 254 may be analyzed to combine data blocks with common dimensions into combined data blocks 262 of the re-grouped data stream 216 and combined data blocks 264 of the re-grouped data stream 218, respectively.

In one embodiment, the common dimensions of the data blocks 250, 252 and 254 within the data streams 202, 204 and 206, respectively, can be combined if the density is greater than a predefined threshold. For example, some dimensions may not be repeated as often within the data streams 202, 204 and 206. Thus, combining the dimensions may not offer much improvement to the compression ratio. The predefined threshold may be any value that provides an optimal improvement to the compression ratio.

In one example, the predefined threshold may be 50%. For example, if combining data blocks 250 with common dimensions in data stream 202 reduces the density of data blocks 250 by greater than 50%, then the data blocks 250 with the common dimensions may be combined.

In one embodiment, the multiplexed data stream 208 may be compressed using the methods described above and then stored. In one embodiment, the compressed data streams may be written to a file system in the DB 106.

Figure 3:
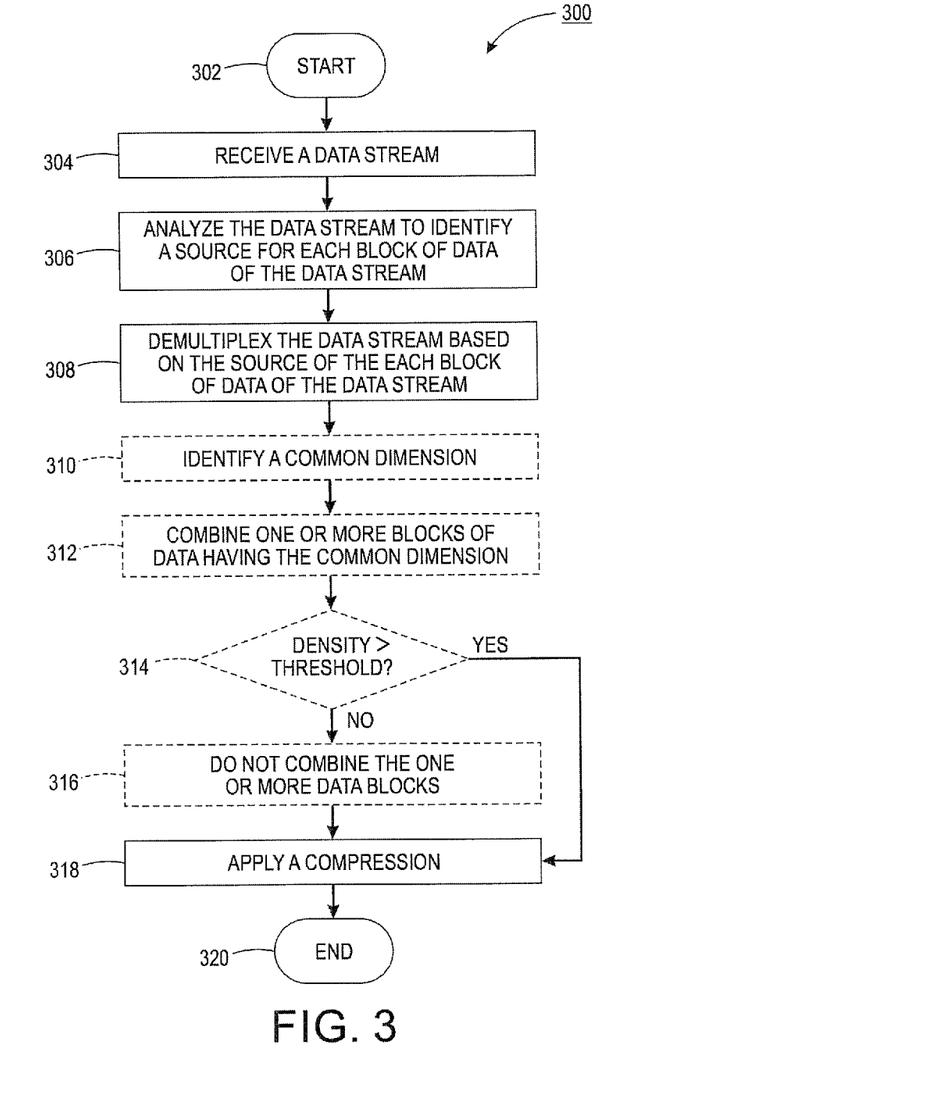
FIG. 3 illustrates a flowchart of an example method for improving data compression.

FIG. 3 illustrates a flowchart of an example method 300 for improving data compression in accordance with the present disclosure. In one embodiment, steps, functions and/or operations of the method 300 may be performed by an AS 104. In one embodiment, the steps, functions, or operations of method 300 may be performed by a computing device or system 400, and/or processor 402 as described in connection with FIG. 4 below. For illustrative purpose, the method 300 is described in greater detail below in connection with an embodiment performed by a processor, such as processor 402.

The method 300 begins in step 302. At step 304, a processor receives a data stream. In one embodiment, the data stream comprises a multiplexed data stream from a plurality of different sources. The plurality of different sources may be any type of device, vehicle, appliance or transmitter that is capable of sending data. For example, the different sources of data may be a wireless endpoint device (e.g., a smart phone, a laptop computer, a tablet computer, a wireless beacon, and the like), a moving vehicle that continuously transmits global positioning system (GPS) location data as the vehicle is moving, an appliance that continually transmits temperature data, inventory data, and the like, a wired device (e.g., a desktop computer, a router, a gateway, and the like), and the like. In one embodiment, the blocks of data transmitted by each one of the different sources of data may be multiplexed into a single data stream.

At step 306, the processor analyzes the data stream to identify a source for each block of data of the data stream. For example, rather than attempting to compress the multiplexed data stream containing different types of data from different sources of data, the processor may attempt to analyze the data stream to re-group the blocks of data based on a source of the block of data. The processor may sort the data stream containing blocks of data from a plurality of different sources based on a source of the plurality of different sources associated with each block of data in the data stream.

In one embodiment, the processor may analyze the data stream in real time. For example, the data stream may be buffered and analyzed in as the data arrives continuously. In another embodiment, the processor may analyze the data stream in segments. For example, the data stream may be divided into segments and stored in the buffer. The processor may then analyze each segment.

At step 308, the processor demultiplexer the data stream based on the source of the each block of data of the data stream. For example, the blocks of data in the data stream may be re-grouped into larger blocks of data based on the source of each block of data in the data stream. For example, blocks of data from a first source may be re-grouped together, blocks of data from a second source may be re-grouped together, and so forth. In one embodiment, the number of blocks of data in the larger blocks of data grouped by source is less than the number of blocks of data in the data stream.

At optional step 310, the processor may identify a common dimension. In one embodiment, the processor may automatically identify the common dimension through statistical properties of the data. For example, blocks of data from a source may have a common dimension. In one embodiment, a dimension may be a characteristic, description, unit of measure, and the like associated with a data block. For example, the dimension may include a GPS coordinate (e.g., longitude value, a latitude value, density of which is highly correlated), a temperature value, a number, a time value (e.g., a day, an hour, a minute, a second, etc.), and the like.

At optional step 312, the processor may combine one or more blocks of data having the common dimension. For example, GPS data transmitted from a moving vehicle may be sent as a longitude values and latitude values. In one embodiment, the blocks of data having a longitude dimension may be combined and/or the blocks of data having a latitude dimension may be combined. As a result, for highly correlated initial dimensions, the resulting combined dimension will allow much higher compression through known algorithms, such as predictive coding or arithmetic coding.

At optional step 314, the processor may determine if a density of the combined data blocks is greater than a threshold. For example, the number of blocks having a common dimension may not be enough to reduce the overall number of data blocks to make a significant improvement in the compression ratio. As a result, the density of the re-grouped blocks of data may be compared to a threshold. In one example, the predefined threshold may be 50%. For example, if combining data blocks with common dimensions in the data stream reduces the density of data blocks by greater than 50%, then the data blocks with the common dimensions may be combined. Otherwise, the improvement to the compression ratio may not outweigh the costs of processing required to combine the data blocks with the common dimensions. If the density of the combined data blocks is not greater than the threshold, then the method may proceed to optional step 316.

At optional step 316, the processor may not combine the one or more data blocks. In other words, the amount of data blocks may not be reduced enough to achieve a significant increase in compression ratio compared to the amount of processing required to combine the data blocks with the common dimension. As a result, the data blocks may not be combined and the method may proceed to step 318.

Referring back to optional step 316, if the density of the combined data block is greater than the threshold, the method may proceed to step 318. At step 318, the processor applies a compression. In one embodiment, the compression may be a predictive coding.

In one embodiment, if the method 300 arrives at step 318 directly from optional step 314, then the compression may be applied to the data stream that has been demultiplexed based on a source of each data block and where data blocks having a common dimension are combined. In one embodiment, if the method 300 arrives at step 318 from step 316, the density of combining the data blocks having a common dimension may not have been sufficient and the compression may be applied to the data stream that has been demultiplexed based on a source of each data block. At step 320, the method 300 ends.

It should be noted that although not specifically specified, one or more steps, functions or operations of the method 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

As such, the present disclosure provides at least one advancement in the technical field of data compression. This advancement allows for costs associated with storage of big data to be reduced. The present disclosure also provides a transformation of data. For example, multiplexed data streams are transformed into blocks of data that are organized based on a source of the data and a common dimension of the data to achieve a greater compression ratio.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for improving data compression, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300, as discussed above, is implemented in a distributed or parallel manner for a particular illustrative example, i.e., the steps of the above method 300, or the entirety of method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for improving data compression (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for improving data compression (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a processor, a data stream, wherein the data stream comprises blocks of data that are multiplexed from a plurality of different source devices;
analyzing, by the processor, the data stream to identify a source device of the plurality of different source devices for each of the blocks of data of the data stream;
demultiplexing, by the processor, the data stream based on the source device of the each of the blocks of data of the data stream;
identifying, by the processor, a common dimension between blocks of data of the data stream from a common source device;
estimating, by the processor, a density of the blocks of data of the data stream from the common source device that have the common dimension;
combining, by the processor, the blocks of data of the data stream from the common source device that have the common dimension when the density that is estimated is greater than a predefined threshold; and
applying, by the processor, a compression to the data stream that is demultiplexed based on the source device of the each of the blocks of data of the data stream and the blocks of data of the data stream from the common source device that have the common dimension and that are combined.

2. The method of claim 1, wherein the compression comprises a predictive coding or an arithmetic coding.

3. The method of claim 1, wherein the data stream comprises different types of data having different dimensions.

4. The method of claim 1, further comprising:
writing, by the processor, the data stream that is compressed to a file system.

5. A non-transitory computer-readable medium storing instructions which, when executed by a processor, cause the processor to perform operations, the operations comprising:
receiving a data stream, wherein the data stream comprises blocks of data that are multiplexed from a plurality of different source devices;
analyzing the data stream to identify a source device of the plurality of different source devices for each of the blocks of data of the data stream;
demultiplexing the data stream based on the source device of the each of the blocks of data of the data stream;
identifying a common dimension between the blocks of data of the data stream from a common source device;
estimating a density of the blocks of data of the data stream from the common source device that have the common dimension;
combining the blocks of data of the data stream from the common source device that have the common dimension when the density that is estimated is greater than a predefined threshold; and applying a compression to the data stream that is demultiplexed based on the source device of the each of the blocks of data of the data stream.

6. The non-transitory computer-readable medium of claim 5, wherein the compression comprises a predictive coding or an arithmetic coding.

7. The non-transitory computer-readable medium of claim 5, wherein the data stream comprises different types of data having different dimensions.

8. The non-transitory computer-readable medium of claim 5, the operations further comprising:
writing the data stream that is compressed to a file system.

9. An apparatus, comprising:
a processor; and
a computer-readable storage device storing a plurality of instructions which, when executed by the processor, cause the processor to perform operations, the operations comprising:
receiving a data stream, wherein the data stream comprises blocks of data that are multiplexed from a plurality of different source devices;
analyzing the data stream to identify a source device of the plurality of different source devices for each of the blocks of data of the data stream;
demultiplexing the data stream based on the source device of the each of the blocks of data of the data stream;
identifying a common dimension between the blocks of data of the data stream from a common source device;
estimating a density of the blocks of data of the data stream from the common source device that have the common dimension;
combining the blocks of data of the data stream from the common source device that have the common dimension when the density that is estimated is greater than a predefined threshold; and
applying a compression to the data stream that is demultiplexed based on the source device of the each of the blocks of data of the data stream.

10. The apparatus of claim 9, wherein the compression comprises a predictive coding or an arithmetic coding.

11. The apparatus of claim 9, wherein the data stream comprises different types of data having different dimensions.

12. The apparatus of claim 9, the operations further comprising:
writing the data stream that is compressed to a file system.

* * * * *